US012506879B2

United States Patent
Zhao et al.

(10) Patent No.: US 12,506,879 B2
(45) Date of Patent: Dec. 23, 2025

(54) DIRECTIONAL NEAREST NEIGHBOR PREDICTION MODE

(71) Applicant: Tencent America LLC, Palo Alto, CA (US)

(72) Inventors: Xin Zhao, San Jose, CA (US); Xiaozhong Xu, State College, PA (US); Guichun Li, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 140 days.

(21) Appl. No.: 18/377,277

(22) Filed: Oct. 5, 2023

(65) Prior Publication Data
US 2024/0121404 A1  Apr. 11, 2024

Related U.S. Application Data

(60) Provisional application No. 63/414,312, filed on Oct. 7, 2022.

(51) Int. Cl.
*H04N 19/159* (2014.01)
*H04N 19/105* (2014.01)
*H04N 19/176* (2014.01)

(52) U.S. Cl.
CPC ......... *H04N 19/159* (2014.11); *H04N 19/105* (2014.11); *H04N 19/176* (2014.11)

(58) Field of Classification Search
CPC .................................................... H04N 19/159
See application file for complete search history.

(56) References Cited

U.S. PATENT DOCUMENTS

2013/0170546 A1* 7/2013 Kim ...................... H04N 19/50
                                                          375/240.12
2013/0266063 A1* 10/2013 Jun ...................... H04N 19/147
                                                          375/240.12
(Continued)

OTHER PUBLICATIONS

C. Muhammed, et al., Algorithm description of Enhanced Compression Model 6 (ECM 6), Joint Video Experts Team (JVET) of ITU-T SG 16 WP 3 and ISO/IEC JTC 1/SC 29 27th Meeting, by teleconference, Jul. 13-22, 2022, Document: IVET-AA2025, pp. 1-53.

(Continued)

*Primary Examiner* — Irfan Habib
(74) *Attorney, Agent, or Firm* — ARENTFOX SCHIFF LLP

(57) ABSTRACT

Aspects of the disclosure include methods and apparatuses for video coding. One of the apparatuses includes processing circuitry that receives a bitstream of a current block in a current picture. The current block is coded with a directional nearest neighbor prediction (DNNP) mode. The processing circuitry selects a prediction value for a sample in the current block from a top-left value, a top value, or a left value based on one or more difference values between respective paired values of (i) the top-left value associated with a top-left reference sample that is a top-left neighbor of the current block, (ii) the top value associated with a top reference sample that is a top neighbor of the sample in the current block, and (iii) the left value associated with a left reference sample that is a left neighbor of the sample in the current block. The processing circuitry reconstructs the current block using the selected prediction value for the sample in the current block.

20 Claims, 11 Drawing Sheets

(56) References Cited

U.S. PATENT DOCUMENTS

| | | | | |
|---|---|---|---|---|
| 2015/0264348 A1* | 9/2015 | Zou | ............... | H04N 19/593 |
| | | | | 375/240.02 |
| 2017/0359595 A1* | 12/2017 | Zhang | ............... | H04N 19/186 |
| 2018/0343469 A1* | 11/2018 | Jin | ............... | H04N 19/132 |
| 2020/0296418 A1* | 9/2020 | Zhao | ............... | H04N 19/176 |
| 2022/0159271 A1* | 5/2022 | Jun | ............... | H04N 19/13 |
| 2024/0048760 A1* | 2/2024 | Heo | ............... | H04N 19/593 |

OTHER PUBLICATIONS

Peter de Rivaz, and Jack Haughton. "Av1 bitstream & decoding process specification." The Alliance for Open Media, Jan. 8, 2019, pp. 1-681.
ITU-T and ISO/IEC, "Versatile Video Coding", ITU-T Rec. H.266 and ISO/IEC 23090-3, Aug. 2020, pp. 1-516.
International Search Report and Written Opinion issued Feb. 16, 2024 in Application No. PCT/US2023/076234, pp. 1-17.
Chen et al. "An Overview of Coding Tools in AV1: the First Video Codec from the Alliance for OpenMedia." In: SIP (2020), vol. 9, e6, Dec. 19, 2019, pp. 1-15.

* cited by examiner

DIRECTIONAL NEAREST NEIGHBOR PREDICTION MODE

INCORPORATION BY REFERENCE

The present application claims the benefit of priority to U.S. Provisional Application No. 63/414,312, "Directional nearest neighbor prediction mode" filed on Oct. 7, 2022, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives a bitstream of a current block in a current picture. Responsive to the current block being coded with a directional nearest neighbor prediction (DNNP) mode, the processing circuitry selects a prediction value for a sample in the current block from a top-left value, a top value, or a left value based on (i) whether an absolute value $|\Delta_1|$ is greater than N0 multiplied by an absolute value $|\Delta_2|$ or (ii) whether the absolute value $|\Delta_2|$ is greater than N1 multiplied by the absolute value $|\Delta_1|$. The value $\Delta_1$ is a difference between the left value and the top-left value, and the value $\Delta_2$ is a difference between the top value and the top-left value. The top-left value is associated with a top-left reference sample of the current block, the top value is associated with a top reference sample of the sample that is in a same column as the sample, and the left value is associated with a left reference sample of the sample that is in a same row as the sample. N0 is a first positive integer, and N1 is a second positive integer. The processing circuitry reconstructs the current block using the selected prediction value for the sample in the current block.

In an aspect, the top-left value is a value of the top-left reference sample of the current block, the top value is a value of the top reference sample of the sample, and the left value is a value of the left reference sample. The processing circuitry selects a prediction sample from the top-left reference sample of the current block, the top reference sample of the sample, and the left reference sample based on (i) whether the absolute value $|\Delta_1|$ is greater than N0 multiplied by the absolute value $|\Delta_2|$ or (ii) whether the absolute value $|\Delta_2|$ is greater than N1 multiplied by the absolute value $|\Delta_1|$. A value of the prediction sample is the prediction value.

In an aspect, the processing circuitry derives the top value using the top reference sample and at least one reference sample of (i) a left neighbor of the top reference sample, (ii) a right neighbor of the top reference sample, (iii) a top-right reference sample of the current block, or (iv) a bottom-left reference sample of the current block.

In an example, the at least one reference sample includes the left neighbor of the top reference sample and the right neighbor of the top reference sample. The processing circuitry derives the top value as (i) an average or (ii) a median value of a value of the top reference sample, a value of the left neighbor of the top reference sample, and a value of the right neighbor of the top reference sample.

In an example, the at least one reference sample includes the top-right reference sample of the current block, and the bottom-left reference sample of the current block. The processing circuitry derives the top value as (i) an average or (ii) a median value of a value of the top reference sample, a value of the top-right reference sample of the current block, and a value of the bottom-left reference sample of the current block.

In an aspect, the processing circuitry derives the left value using the left reference sample and at least one reference sample of (i) an above neighbor of the left reference sample, (ii) a below neighbor of the left reference sample, (iii) a top-right reference sample of the current block, or (iv) a bottom-left reference sample of the current block.

In an example, the at least one reference sample includes the above neighbor of the left reference sample and the below neighbor of the left reference sample. The processing circuitry derives the left value as (i) an average or (ii) a median value of a value of the left reference sample, a value of the above neighbor of the left reference sample, and a value of the below neighbor of the left reference sample.

In an example, the at least one reference sample includes the top-right reference sample of the current block and the bottom-left reference sample of the current block. The processing circuitry includes derives the left value as (i) an average or (ii) a median value of a value of the left reference sample, a value of the top-right reference sample of the current block, and a value of the bottom-left reference sample of the current block.

In an example, the processing circuitry derives the top-left value using the top-left reference sample, a right neighbor of the top-left reference sample, and a below neighbor of the top-left reference sample.

In an example, the processing circuitry derives the top-left value as (i) an average or (ii) a median value of a value of the top-left reference sample, a value of the right neighbor of the top-left reference sample, and a value of the below neighbor of the top-left reference sample.

In an example, N0 is larger than or equal to 2. In response to the absolute value $|\Delta_1|$ being greater than N0 multiplied by the absolute value $|\Delta_2|$, the processing circuitry selects the left value as the prediction value for the sample in the current block.

In an example, N1 is larger than or equal to 2. In response to the absolute value $|\Delta_2|$ being greater than N1 multiplied by the absolute value $|\Delta_1|$, the processing circuitry selects the top value as the prediction value for the sample in the current block.

In an example, N0 is larger than or equal to 2 and N1 is larger than or equal to 2. In response to the absolute value $|\Delta_1|$ not being greater than N0 multiplied by the absolute value $|\Delta_2|$ and the absolute value $|\Delta_2|$ not being greater than N1 multiplied by the absolute value $|\Delta_1|$, the processing circuitry selects the prediction value for the sample in the current block based on whether the value $\Delta_1$ and the value $\Delta_2$ have opposite signs. In response to the value $\Delta_1$ and the value $\Delta_2$ having opposite signs, the processing circuitry selects the top-left value as the prediction value for the sample in the current block. In response to the value $\Delta_1$ and the value $\Delta_2$ having a same sign, the processing circuitry selects the top value as the prediction value for the sample in the current block in response to the absolute value $|\Delta_1|$ being less than the absolute value $|\Delta_2|$ and selects the left value as the prediction value for the sample in the current block in response to the absolute value $|\Delta_1|$ not being less than the absolute value $|\Delta_2|$.

In an example, N0 is 1. In response to the absolute value $|\Delta_1|$ being greater than the absolute value $|\Delta_2|$, the processing circuitry selects the left value as the prediction value for the sample in the current block. In response to the absolute value $|\Delta_1|$ not being greater than the absolute value $|\Delta_2|$, the processing circuitry selects the top value as the prediction value for the sample in the current block.

In an aspect, the bitstream comprises a flag signaled for the current block indicating whether the DNNP mode is applied to the current block.

In an aspect, a neighboring block of the current block is coded using the DNNP mode. In response to deriving an intra prediction mode of the current block based at least on the neighboring block, the processing circuitry maps the DNNP mode of the neighboring block to an intra prediction mode that is one of a DC mode, a Planar mode, a Planar-V mode, a Planar-H mode, a Smooth mode, a Smooth-H mode, a Smooth-V mode, or an angular mode.

In an aspect, the current block is a chroma block coded with a chroma intra prediction mode. The processing circuitry derives the chroma intra prediction mode of the current block from an intra prediction mode of a co-located luma block of the current block by deriving the chroma intra prediction mode of the current block as an intra prediction mode that is one of a DC mode, a Planar mode, a Planar-V mode, a Planar-H mode, a Smooth mode, a Smooth-H mode, a Smooth-V mode, or an angular mode in response to the intra prediction mode of the co-located luma block being a DNNP mode.

In an example, the bitstream comprises a signaled high level syntax element indicating whether the DNNP mode is enabled at a corresponding high level.

In an aspect, the current block is coded with a directional nearest neighbor prediction (DNNP) mode. The processing circuitry selects a prediction value for a sample in the current block from a top-left value, a top value, or a left value based on one or more difference values between respective paired values of (i) the top-left value associated with a top-left reference sample that is a top-left neighbor of the current block, (ii) the top value associated with a top reference sample that is a top neighbor of the sample in the current block, and (iii) the left value associated with a left reference sample that is a left neighbor of the sample in the current block.

Aspects of the disclosure also provide a non-transitory computer-readable medium storing instructions which, when executed by a computer, cause the computer to perform any of the methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
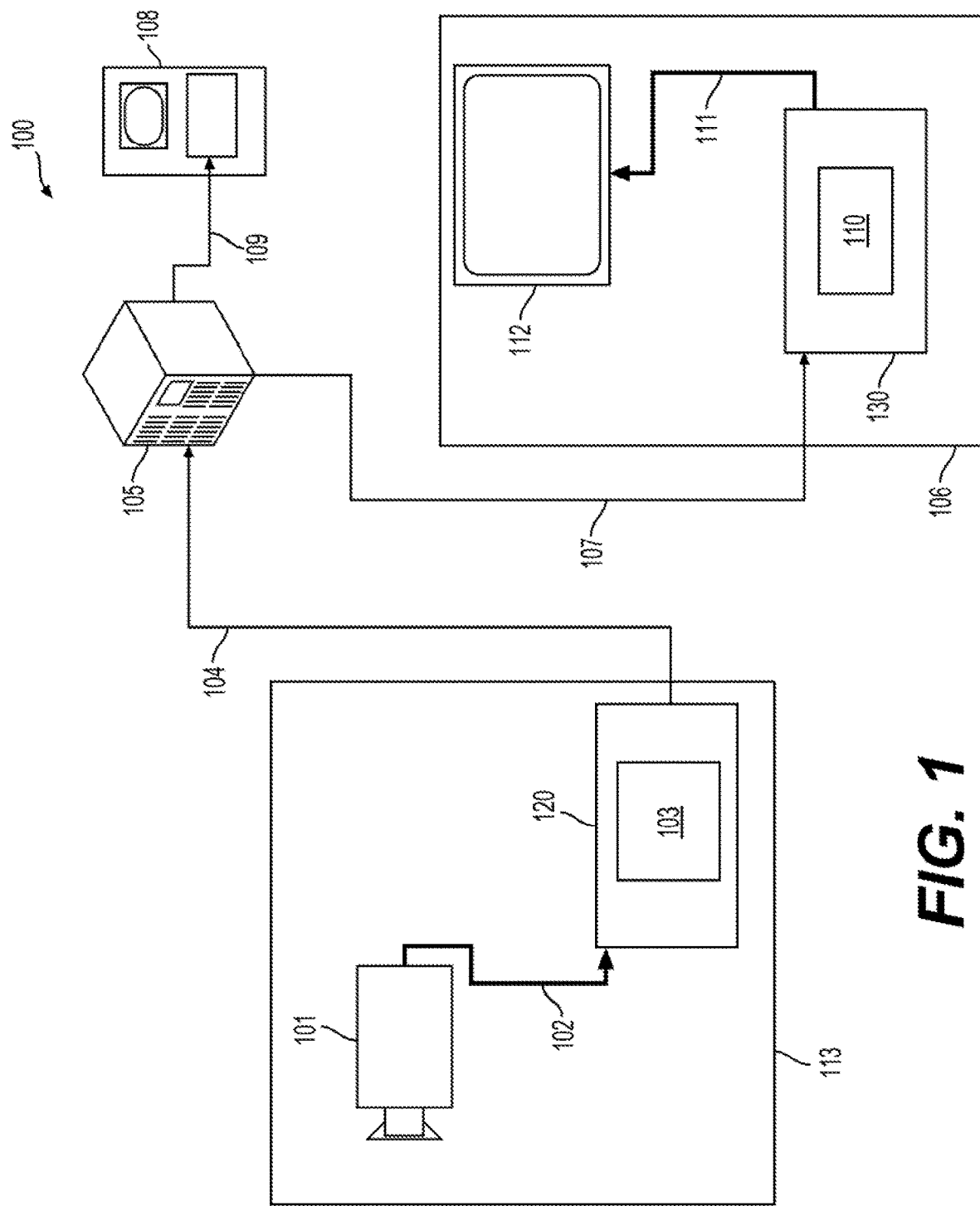
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
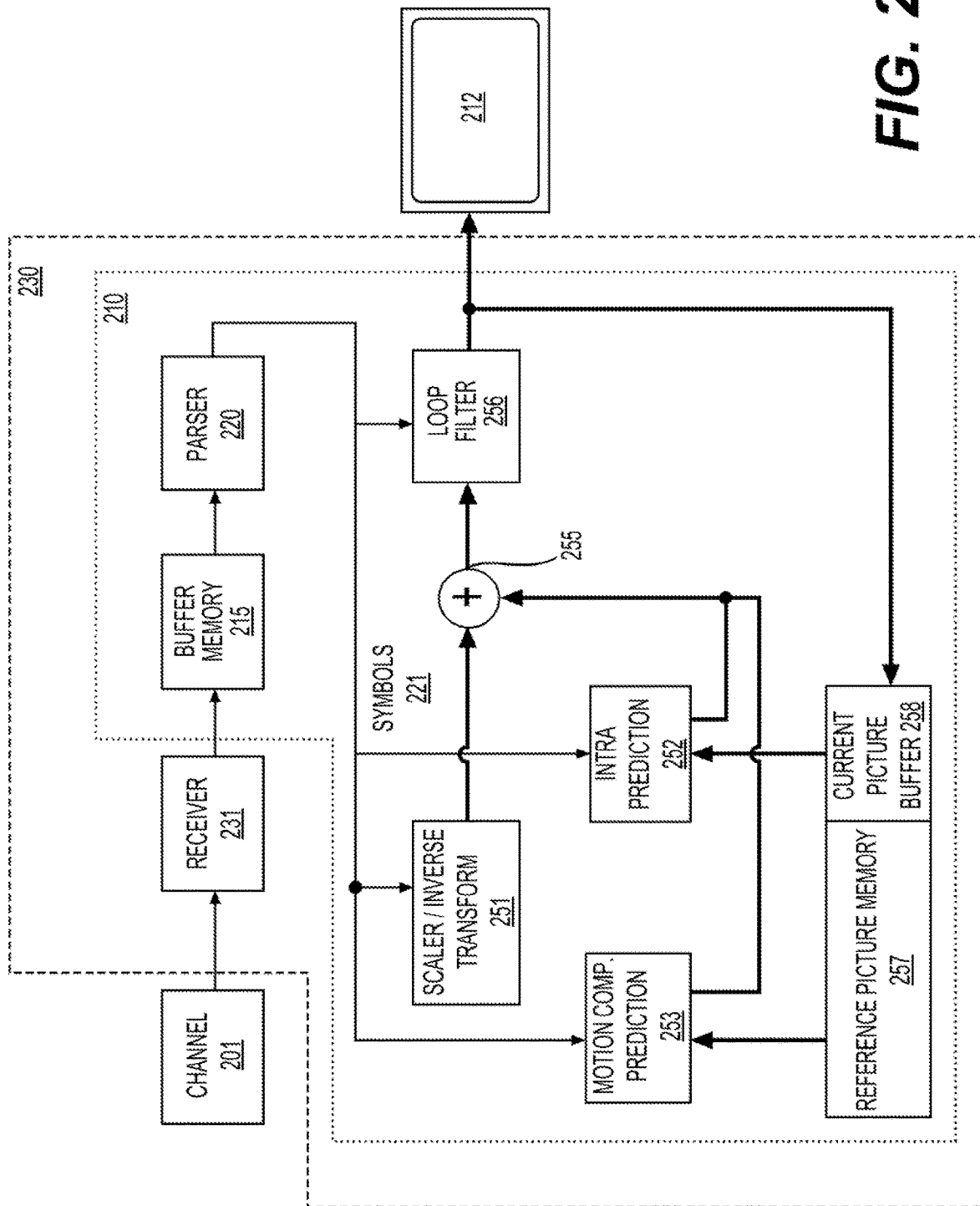
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
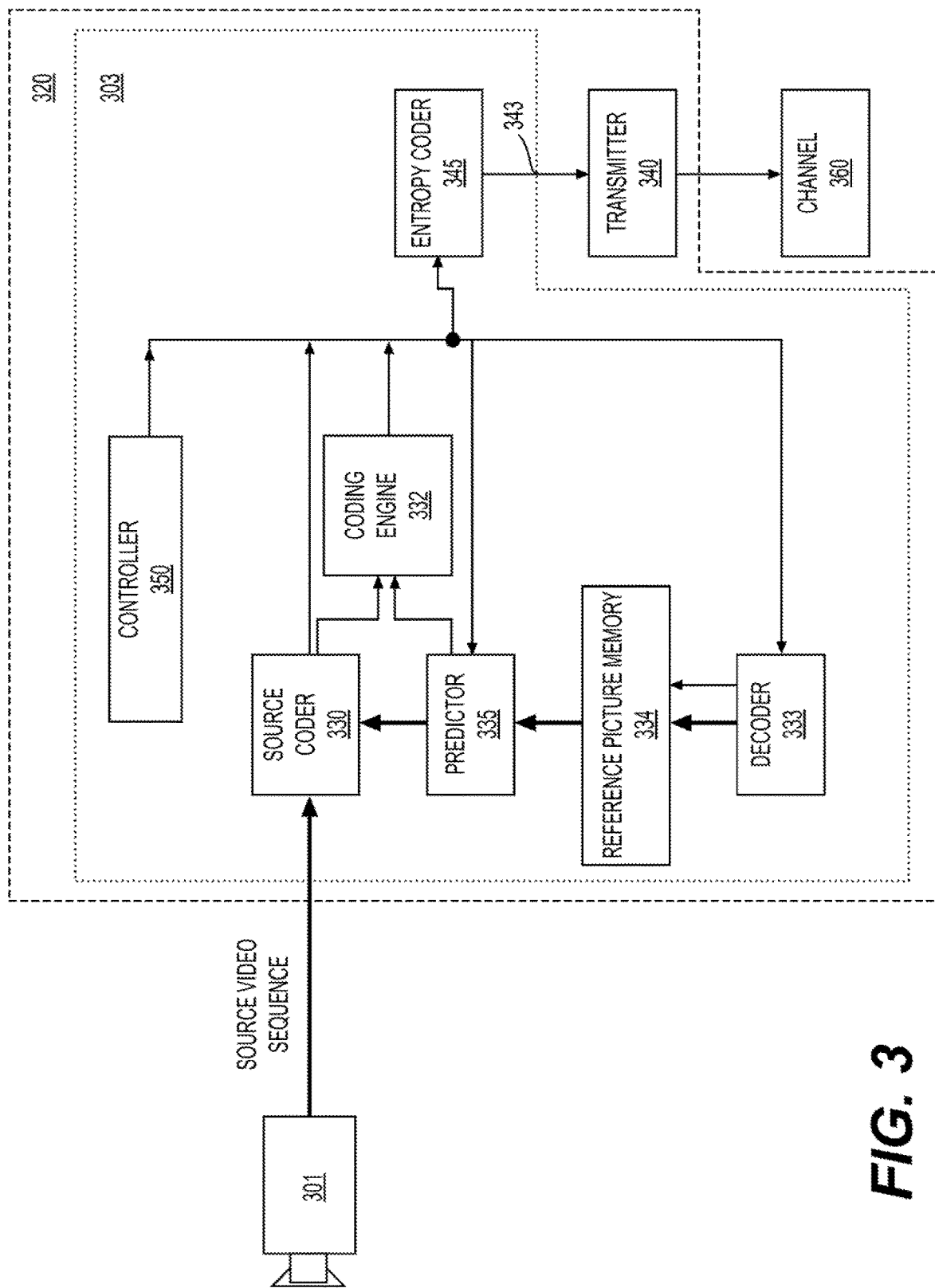
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Figure 4:
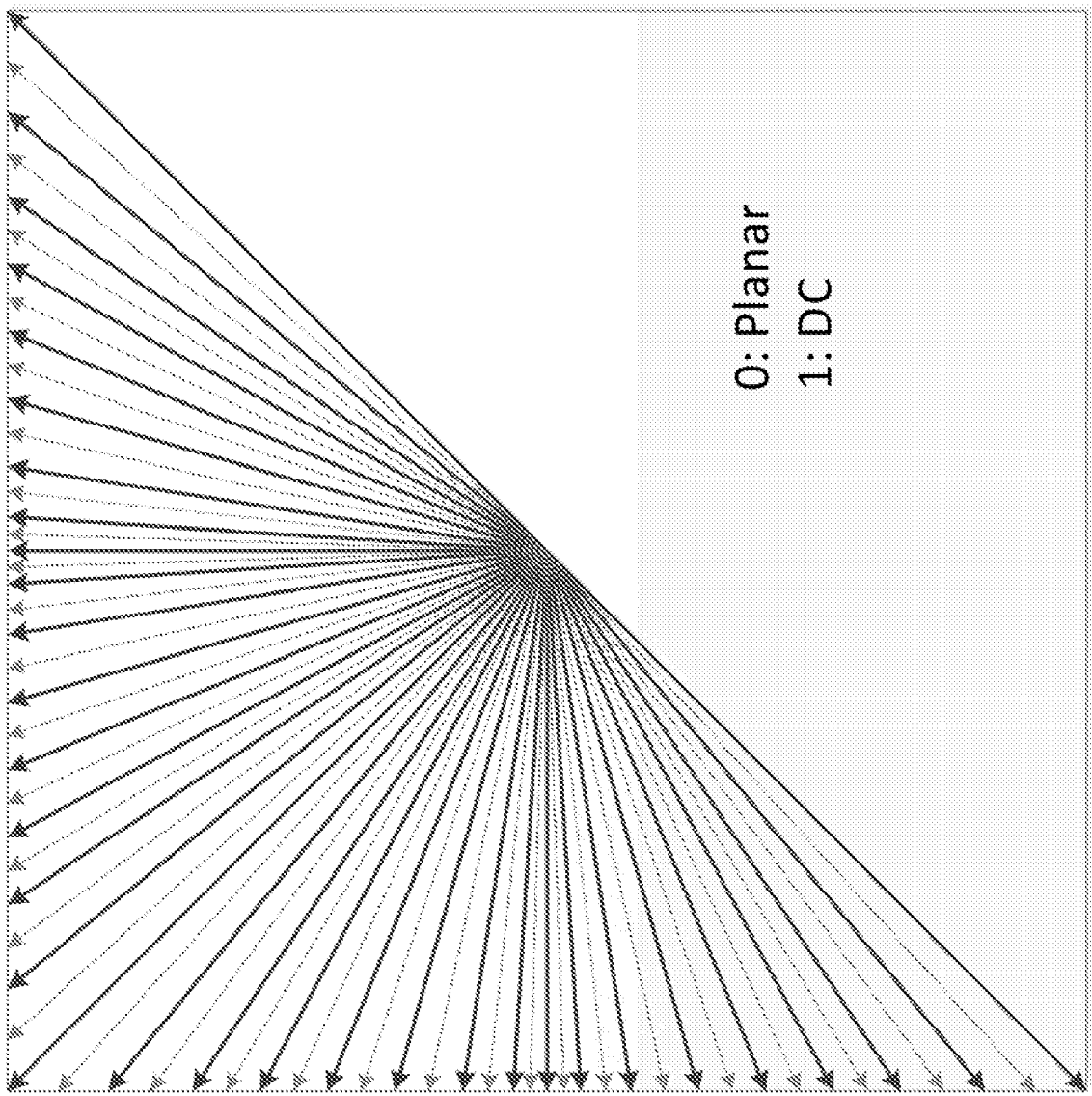
FIG. 4 shows intra prediction modes according to aspects of the disclosure.

Various intra prediction modes for intra prediction can be used in video coding such as in HEVC and VVC. FIG. 4 shows intra prediction modes (e.g., 35 intra prediction modes such as used in HEVC and 67 intra prediction modes such as used in VVC) according to some aspects of the disclosure. In an example, such as in HEVC, there are 35 intra prediction modes that include 33 directional intra prediction modes (also referred to as directional intra modes) indicated by solid lines in FIG. 4, a planar mode (e.g., the mode 0), and a DC mode (e.g., the mode 1). The intra prediction modes can be signaled by three most probable modes (MPMs) and 32 remaining modes.

To capture arbitrary edge directions presented in a natural video, a number of directional intra modes is extended from 33 (indicated by solid lines in FIG. 4) to 65. The 33 and 65 directional intra modes correspond to the directional intra modes of HEVC and VVC, respectively, for example. The new directional modes not in HEVC are depicted as dotted arrows in FIG. 4, and the planar mode and the DC mode remain the same. In some aspects, the denser directional intra prediction modes can apply to all block sizes and for both luma and chroma intra predictions.

In some aspects, such as in VVC, several angular intra prediction modes are adaptively replaced with wide-angle intra prediction modes for non-square blocks.

In an aspect, such as in HEVC, an intra-coded block has a square shape and a length of each side of the intra-coded block is a power of 2. In an example of HEVC, every intra-coded block has a square shape and the length of each of its side is a power of 2. Thus, no division operations are required to generate an intra-predictor using the DC mode. In an example, such as in VVC, blocks can have a rectangular shape, and a division operation per block can be used in the general case. In an example, to avoid division operations for the DC prediction, only the longer side is used to compute an average for non-square blocks.

To keep the complexity of an MPM list generation low, an intra mode coding method with 6 MPMs can be used by considering two available neighboring intra modes. The following three aspects can be considered to construct the MPM list: (i) default intra modes, (ii) neighboring intra modes, and (iii) derived intra modes.

A unified 6-MPM list can be used for intra blocks irrespective of whether multiple reference line (MRL) and intra sub-partitions (ISP) coding tools are applied or not. The MPM list can be constructed based on intra modes of a left neighboring block and an above neighboring block. The mode of the left neighboring block can be denoted as Left and the mode of the above neighboring block (or the above block) is denoted as Above, the unified MPM list can be constructed as follows:

When a neighboring block is not available, its intra mode is set to Planar by default.
If both modes Left and Above are non-angular modes:
    MPM list→{Planar, DC, V, H, V−4, V+4}
If one of the modes Left and Above is an angular mode, and the other is non-angular:
    Set a mode Max as the larger mode in Left and Above
    MPM list→{Planar, Max, Max−1, Max+1, Max−2, Max+2}

If Left and Above are both angular and Left and Above are different:
   Set a mode Max as the larger mode in Left and Above
   Set a mode Min as the smaller mode in Left and Above
   If Max−Min is equal to 1:
      MPM list→{Planar, Left, Above, Min−1, Max+1, Min−2}
   Otherwise, if Max−Min is greater than or equal to 62:
      MPM list→{Planar, Left, Above, Min+1, Max−1, Min+2}
   Otherwise, if Max−Min is equal to 2:
      MPM list→{Planar, Left, Above, Min+1, Min−1, Max+1}
   Otherwise:
      MPM list→{Planar, Left, Above, Min−1, —Min+1, Max−1}
If Left and Above are both angular and are the same:
   MPM list→{Planar, Left, Left−1, Left+1, Left−2, Left+2}

Besides, the first bin of an MPM index codeword can be CABAC context coded. In total three contexts can be used, corresponding to whether the current intra block is MRL enabled, ISP enabled, or a normal intra block.

During the MPM list (e.g., the 6 MPM list) generation process, pruning can be used to remove duplicated modes so that only unique modes can be included into the MPM list. For entropy coding of the 61 non-MPM modes, a Truncated Binary Code (TBC) can be used.

Figure 5:
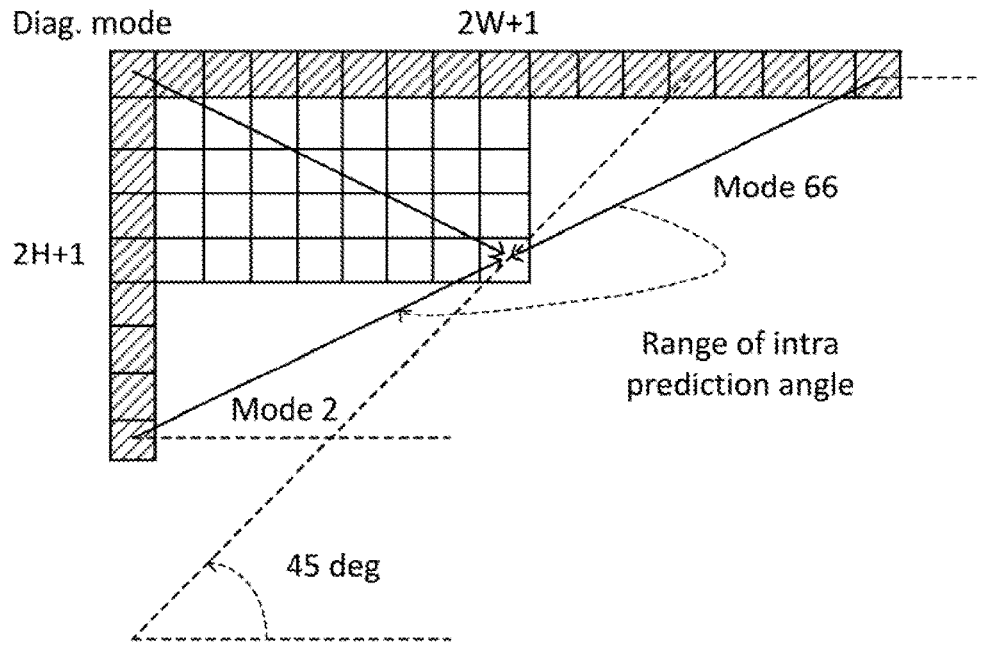
FIGS. 5-6 show examples of reference samples for wide-angular intra prediction according to aspects of the disclosure.
Figure 6:
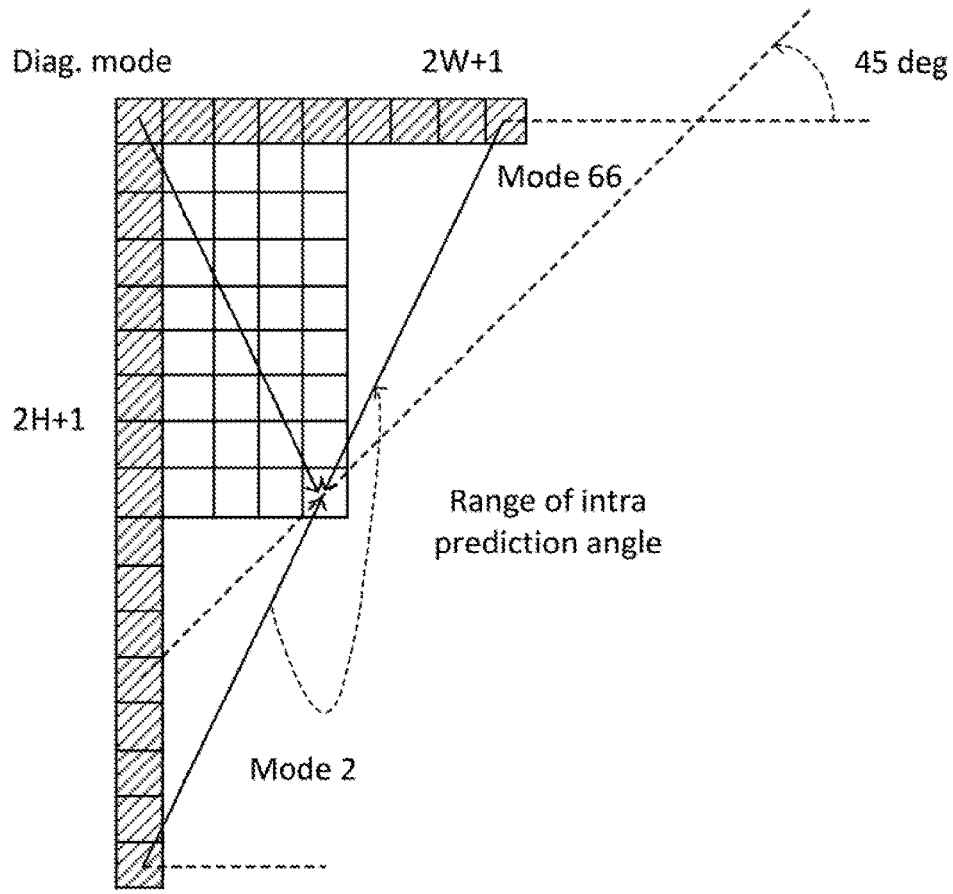

In an aspect, such as in VVC, wide-angle intra prediction can be applied, such as to non-square blocks. In an aspect, conventional angular intra prediction directions can be defined from 45° to −135° in a clockwise direction. In VVC, several conventional angular intra prediction modes can be adaptively replaced with wide-angle intra prediction modes for non-square blocks. The replaced modes can be signaled using the original mode indexes, which are remapped to the indexes of wide angular modes after parsing. The total number of intra prediction modes (e.g., 67) can be unchanged and the intra mode coding method can be unchanged. FIGS. 5-6 show examples of reference samples for wide-angular intra prediction according to aspects of the disclosure. To support these prediction directions, the top reference with length 2 W+1, and the left reference with length 2H+1, can be defined.

The number of replaced modes in the wide-angular direction mode can depend on an aspect ratio of a block. The replaced intra prediction modes can be illustrated in Table 1.

TABLE 1

Intra prediction modes replaced by wide-angular modes

| Aspect ratio | Replaced intra prediction modes |
| --- | --- |
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, 8, 9 |
| W/H == 1 | None |
| W/H == 1/2 | Modes 59, 60, 61, 62, 63, 64, 65, 66 |
| W/H == 1/4 | Mode 57, 58, 59, 60, 61, 62, 63, 64, 65, 66 |
| W/H == 1/8 | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Figure 7:
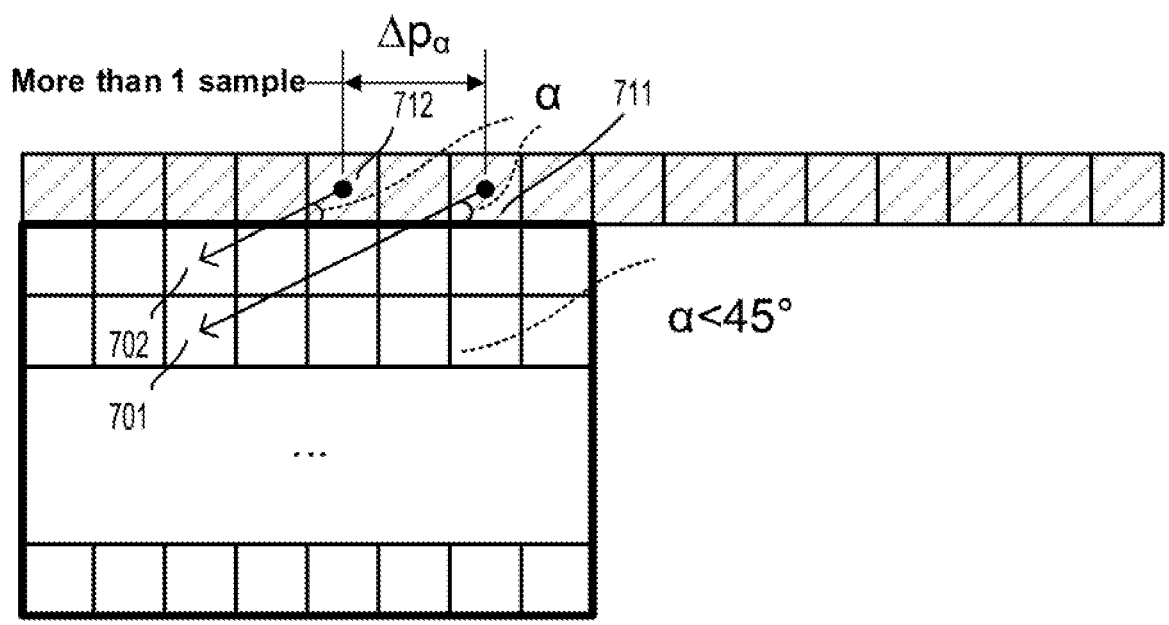
FIG. 7 shows a discontinuity in case of directions beyond 45° according to an aspect of the disclosure.

FIG. 7 shows a discontinuity in case of directions beyond 45° according to an aspect of the disclosure. Referring to FIG. 7, two vertically-adjacent predicted samples (701)-(702) may use two non-adjacent reference samples (711)-(712) in the case of wide-angle intra prediction. Hence, a low-pass reference samples filter and side smoothing can be applied to the wide-angle prediction to reduce the negative effect of an increased gap $\Delta p_\alpha$. 8 modes in the wide-angle modes can satisfy a condition, i.e., a wide-angle mode represents a non-fractional offset, and the 8 modes include modes indicated by mode numbers: [−14, −12, −10, −6, 72, 76, 78, 80]. When a block is predicted by one of these modes [−14, −12, −10, −6, 72, 76, 78, 80], samples in a reference buffer can be directly copied without applying any interpolation. With this modification, a number of samples to be smoothed can be reduced. Further, the above method aligns the design of non-fractional modes in the conventional prediction modes and wide-angle modes.

In an example, such as in VVC, 4:2:2 and 4:4:4 chroma formats can be supported as well as a 4:2:0 chroma format. Chroma derived mode (DM) derivation table for the 4:2:2 chroma format was initially ported from HEVC extending a number of entries from 35 to 67 to align with the extension of intra prediction modes. Since HEVC specification does not support prediction angle below −135 degree and above 45 degree, luma intra prediction modes ranging from 2 to 5 can be mapped to 2. Thus, chroma DM derivation table for the 4:2:2:chroma format can be updated by replacing some values of the entries of the mapping table to convert prediction angle more precisely for chroma blocks.

4-tap interpolation filter (IF) and reference sample smoothing can be applied, for example, in VVC. Four-tap intra interpolation filters can be utilized to improve a directional intra prediction accuracy. In HEVC, a two-tap linear interpolation filter has been used to generate the intra prediction block in the directional prediction modes (i.e., excluding Planar and DC predictors). In VVC, the two sets of 4-tap IFs can replace lower precision linear interpolation (e.g., a two-tap linear IF) used in HEVC, where one is a DCT-based interpolation filter (DCTIF) and the other one is a 4-tap smoothing interpolation filter (SIF). The DCTIF can be constructed in the same way as the one used for chroma component motion compensation in both HEVC and VVC. The SIF can be obtained by convolving the 2-tap linear interpolation filter with a [1 2 1]/4 filter.

Depending on the intra prediction mode, the following reference samples processing can be performed:
   The directional intra-prediction mode can be classified into one of the following groups:
      Group A: vertical or horizontal modes indicated by indices (HOR_IDX, VER_IDX),
      Group B: directional modes that represent non-fractional angles (−14, −12, −10, −6, 2, 34, 66, 72, 76, 78, 80,) and Planar mode,
      Group C: remaining directional modes;
   If the directional intra-prediction mode is classified as belonging to group A, then no filters are applied to reference samples to generate predicted samples;
   Otherwise, if a mode falls into group B and the mode is a directional mode, and all of following conditions are true, then a [1, 2, 1] reference sample filter may be applied (depending on the mode dependent intra smoothing (MDIS) condition) to reference samples to further copy these filtered values into an intra predictor according to the selected direction, but no interpolation filters are applied:

refIdx is equal to 0 (no MRL is used)
TU size is greater than 32
Luma (e.g., the block is a luma block)
No ISP block (e.g., the block is not an ISP block)
Otherwise, if a mode is classified as belonging to group C, an MRL index is equal to 0 (no MRL is used), and the current block is not an ISP block, then only an intra reference sample interpolation filter is applied to reference samples to generate a predicted sample that falls into a fractional or integer position between reference samples according to a selected direction (no reference sample filtering is performed). The interpolation filter type is determined as follows:
Set minDistVerHor equal to Min(Abs(predModeIntra−50), Abs(predModeIntra−18))
Set nTbS equal to (Log 2 (W)+Log 2 (H))>>1
Set intraHorVerDistThres[nTbS] as specified below in Table 2
If minDistVerHor is greater than intraHorVerDistThres [nTbS], SIF is used for the interpolation
Otherwise, DCTIF is used for the interpolation.

TABLE 2

Relationship between a parameter intraHorVerDistThres and nTbs

|  | nTbS = 2 | nTbS = 3 | nTbS = 4 | nTbS = 5 | nTbS = 6 | nTbS = 7 |
|---|---|---|---|---|---|---|
| intraHorVerDistThres [nTbS] | 24 | 14 | 2 | 0 | 0 | 0 |

Figure 8:
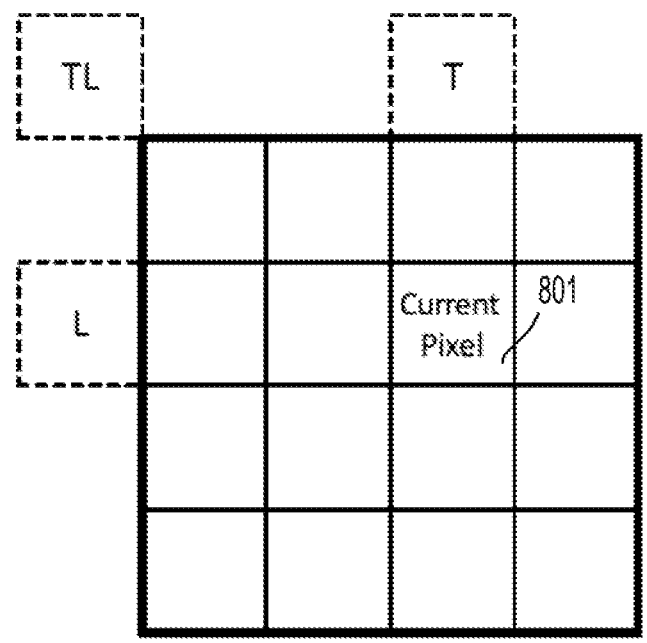
FIG. 8 shows an example of PAETH prediction mode according to an aspect of the disclosure.

Non-directional intra prediction can be applied to predict a block. FIG. 8 shows an exemplary paeth prediction mode according to an aspect of the disclosure. The PAETH prediction mode is a non-directional intra prediction mode. Referring to FIG. 8, the PAETH prediction mode can predict each sample (e.g., a current pixel) (801) from a top reference sample (T) of the sample (801), a left reference sample (L) of the sample (801), and a top-left reference sample (TL) of the sample (801). Of the reference samples TL, T, and L, the one reference sample with a value closest to a value of $(T_{v0}+L_{v0}-TL_{v0})$ can be selected as the prediction sample. $T_{v0}$, $L_{v0}$, and $TL_{v0}$ can represent values of the reference samples T, L, and TL, respectively.

In some aspects, related technologies including intra prediction such as used in VVC standard have limited modes without interpolation. In some examples, for texture patterns with non-horizontal and non-vertical edges, related technologies including intra prediction modes have limitation to model sharp textures. In some examples, these challenges may be overcome by a directional nearest neighbor prediction (DNNP) mode described in the disclosure.

Aspects of the disclosure include a directional nearest neighbor prediction (DNNP) mode for image and video coding. The DNNP mode can be used in intra prediction. The DNNP mode can be an intra prediction mode.

In the disclosure, a high-level syntax element may refer to any of flag or syntax element in a video parameter set (VPS), a sequence parameter set (SPS), a picture parameter set (PPS), an adaptive parameter set (APS), a slice header, a picture header, a tile header, or a CTU header.

According to an aspect of the disclosure, a DNNP mode is proposed. In the DNNP mode, a prediction value for a sample in the current block can be determined (e.g., selected) from values associated with respective reference samples based at least on a first difference between a first pair of the values associated with the respective reference samples and a second pair of the values associated with the respective reference samples. The reference samples can include neighboring reconstructed samples of the current block.

In an aspect, the values associated with the respective reference samples can include a top-left value $TL_v$, a top value $T_v$, and a left value $L_v$. In an example, the top-left value $TL_v$ refers to a value of a reference sample located in the top-left neighbor of the current block; the top value $T_v$ refers to a value of a reference sample located in the top neighbor of the current block; and the left value $L_v$ refers to a value of a reference sample located in the left neighbor of the current block. The top-left value $TL_v$ can be associated with a top-left reference sample of the current block, the top value $T_v$ can be associated with a top reference sample of the sample that is in a same column as the sample, and the left value $L_v$ can be associated with a left reference sample of the sample that is in a same row as the sample. In an example, the top-left reference sample of the current block is the top-left neighbor of the current block, the top reference sample of the sample refers to the top neighbor of the current block, and the left reference sample of the sample refers to the left neighbor of the current block. In an example, the first pair of the values includes the top-left value $TL_v$ and the left value $L_v$, and the first difference is a value $\Delta_1$ (also referred to as a value a) (e.g., $\Delta_1=a=L_v-TL_v$, and $L_v=TL_v+\Delta_1=TL_v+a$). The value $\Delta_1$ can be a difference (e.g., the first difference) between the left value $L_v$ and the top-left value $TL_v$. The second pair of the values can include the top-left value $TL_v$ and the top value $T_v$, and the second difference is a value $\Delta_2$ (also referred to as a value b) (e.g., $\Delta_2=b=T_v-TL_v$, and $T_v=TL_v+\Delta_2=TL_v+b$). The value $\Delta_2$ can be a difference between the top value $T_v$ and the top-left value $TL_v$.

According to an aspect of the disclosure, in the DNNP mode, the prediction value for the sample in the current block can be determined (e.g., selected) from the top-left value $TL_v$, the top value $T_v$, or the left value $L_v$ based on the value $\Delta_1$ (e.g., that is the first difference between the first pair of the values) and the value $\Delta_2$ (e.g., that is the second difference between the second pair of the values). In an example of the DNNP mode, the prediction value for the sample in the current block can be selected from the top-left value $TL_v$, the top value $T_v$, or the left value $L_v$ based on the absolute value $|\Delta_1|$ and the absolute value $|\Delta_2|$, for example, based on (i) whether the absolute value $|\Delta_1|$ is greater than N0 multiplied by the absolute value $|\Delta_2|$ or (ii) whether the absolute value $|\Delta_2|$ is greater than N1 multiplied by the absolute value $|\Delta_1|$. N0 can be a first positive integer, and N1 can be a second positive integer.

Figure 9:
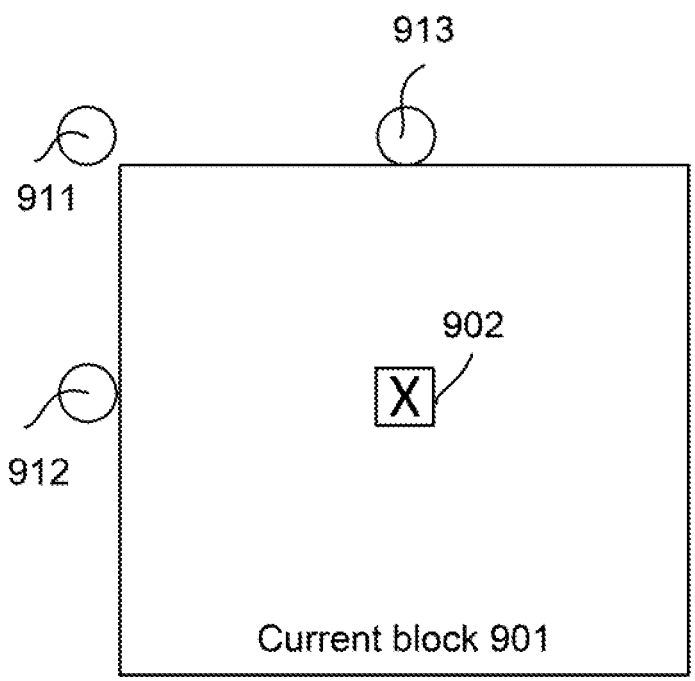
FIG. 9 shows prediction of a sample in a current block using reference samples according to an aspect of the disclosure.

FIG. 9 shows prediction of a sample (marked in X) (902) in a current block (901) using reference samples including a top-left reference sample (911) of the current block (901), a top reference sample (also referred to as an above reference sample) (913) of the sample (902), and a left reference sample (912) according to an aspect of the disclosure. In an example, the top reference sample (913) is in the same column as the sample (902). In an example, the left reference sample (912) is in the same row as the sample (902).

In an aspect, the DNNP modes selects a prediction sample from a specific sample in reference samples (e.g., (911)-(913)) based on the differences (e.g., $\Delta_1$ and $\Delta_2$) between several pairs (e.g., the first pair $L_v$ and $TL_v$, and the second pair $T_v$ and $TL_v$) of the reference samples (e.g., (911)-(913)).

In a first scenario, the top-left value $TL_v$ is a value $TL_{v0}$ of the top-left reference sample (911) of the current block (901), the top value $T_v$ is a value $T_{v0}$ of the top reference sample (913) of the sample (902), and the left value $L_v$ is a value $L_{v0}$ of the left reference sample (912). In the first scenario, for example, for the sample (marked in X) (902) of the current block (901), the prediction sample is selected using the top-left sample (also referred to as the top-left reference sample) (911) having the value $TL_{v0}$, the left sample (also referred to as the left reference sample) (912) which is valued as ($TL_{v0}$+a) or $L_{v0}$ and the top sample (also referred to as the top reference sample) (913) which is valued as ($TL_{v0}$+b) or $T_{v0}$, where a is the difference (i.e., a difference of sample values) between the left sample (912) and the top-left sample (911) and b is the difference (i.e., a difference of sample values) between the top sample (913) and the top-left sample (911). The prediction value of the sample (marked in X) (902) is selected from the values $TL_{v0}$, $TL_{v0}$+a and $TL_{v0}$+b based on a and b. A prediction sample can be selected for the sample (902) from the top-left reference sample (911) of the current block (901), the top reference sample (913) of the sample (902), and the left reference sample (912) based on (i) whether the absolute value $|\Delta_1|$ is greater than N0 multiplied by the absolute value $|\Delta_2|$ or (ii) whether the absolute value $|\Delta_2|$ is greater than N1 multiplied by the absolute value $|\Delta_1|$. A value of the prediction sample can be the prediction value of the sample (902).

In a second scenario, the derivation of the values $TL_v$, ($TL_v$+a) (which is $L_v$), and ($TL_v$+b) (which is $T_v$) can be different from what is described above. Multiple reference samples can be used to derive $TL_v$, ($TL_v$+a) (which is $L_v$), or ($TL_v$+b) (which is $T_v$). For example, in addition to the top-left reference sample (911), the top reference sample (913), and the left reference sample (912), the immediate neighboring reference samples are also considered, as shown in FIG. 10.

Figure 10:
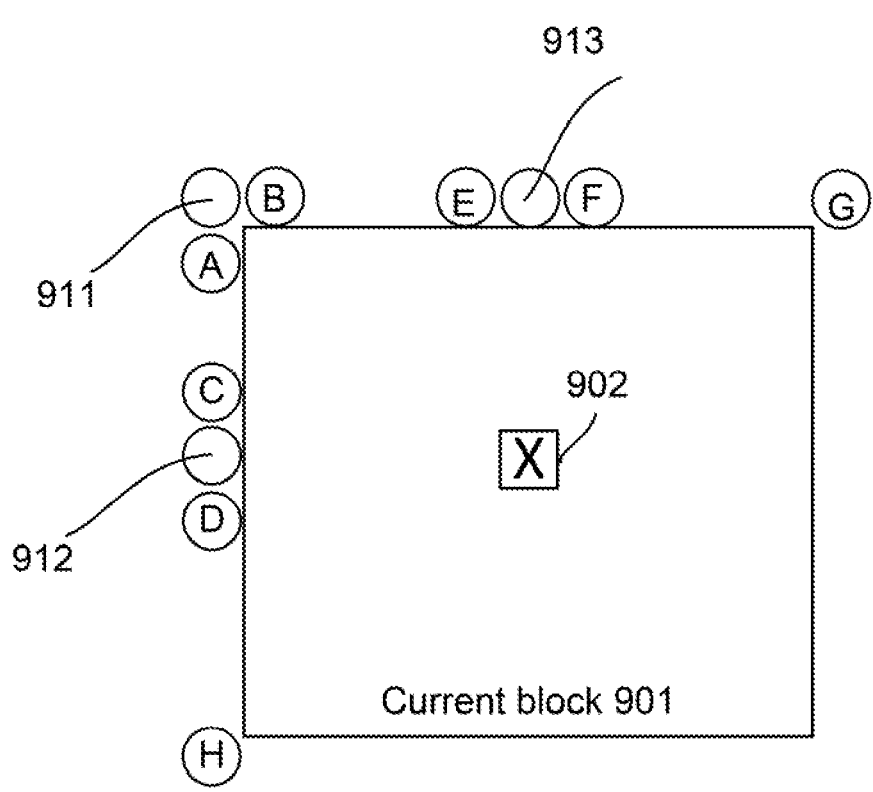
FIG. 10 shows an example of prediction of a sample using reference samples and neighbors of the reference samples according to an aspect of the disclosure.

FIG. 10 shows an example of prediction of the sample (902) using the top-left reference sample (911) of the current block (901), the top reference sample (913) of the sample (902), the left reference sample (912), and other reference samples (e.g., neighbors of the top-left reference sample (911), the top reference sample (913), and/or the left reference sample (912)). In an example, the top-left value $TL_v$ is derived based on values of the top-left reference sample (911) and at least another reference sample. In an example, the top value $T_v$ is derived based on values of the top reference sample (913) and at least another reference sample. In an example, the left value $L_v$ is derived based on values of the left reference sample (912) and at least another reference sample.

In one example, the values at the locations of the above reference sample (913), as well as a left neighbor E and a right neighbor F of the above reference sample (913), and/or a top-right sample (also referred to as a top-right reference sample) G of the current block (901) and a bottom-left sample (also referred to as a bottom-left reference sample) H of the current block (901) are used to generate the top value $T_v$ which is ($TL_v$+b). For example, an average of three values is used as the top value $T_v$ which is ($TL_v$+b). In another example, the median value of the three values is used as $T_v$ which is ($TL_v$+b). In an example, the three values include the values of the reference samples (913), E, and F. In an example, the three values include the values of the reference samples (913), G, and H.

For example, the top value $T_v$ is derived using values of the top reference sample (913) and at least one reference sample of (i) the left neighbor E of the top reference sample (913), (ii) the right neighbor F of the top reference sample (913), (iii) the top-right reference sample G of the current block (901), or (iv) the bottom-left reference sample H of the current block (901). In an example, the at least one reference sample includes the left neighbor E of the top reference sample (913) and the right neighbor F of the top reference sample (913), and the top value $T_v$ is derived as (i) an average or (ii) a median value of a value of the top reference sample (913), a value of the left neighbor E of the top reference sample (913), and a value of the right neighbor F of the top reference sample (913).

In an example, the at least one reference sample includes the top-right reference sample G of the current block (901) and the bottom-left reference sample H of the current block (901), and the top value $T_v$ is derived as (i) an average or (ii) a median value of the value of the top reference sample (913), a value of the top-right reference sample G, and the value of the bottom-left reference sample H.

In an example, the values at the locations of the left reference sample (912), as well as an above neighbor C and a below neighbor D of the left reference sample (912), and/or the top-right sample (also referred to as the top-right reference sample) G of the current block (901) and the bottom-left sample (also referred to as the bottom-left reference sample) H of the current block (901) are used to generate the left value $L_v$ which is ($TL_v$+a). The above neighbor C can be positioned directly above the left reference sample (912), for example, the above neighbor C and the left reference sample (912) can be in the same column and in two adjacent rows. The below neighbor D can be positioned directly below the left reference sample (912), for example, the below neighbor D and the left reference sample (912) can be in the same column and in two adjacent rows. For example, an average of three values is used as the left value L v which is ($TL_v$+a). In another example, the median value of the three values is used as the left value $L_v$ which is ($TL_v$+a). In an example, the three values include the values of the reference samples (912), C, and D. In an example, the three values include the values of the reference samples (912), G, and H.

For example, the left value $L_v$ is derived using values of the left reference sample (912) and at least one reference sample of (i) the above neighbor C of the left reference sample (912), (ii) the below neighbor D of the left reference sample (912), (iii) the top-right reference sample G of the current block (901), or (iv) the bottom-left reference sample H of the current block (901). In an example, the at least one reference sample includes the above neighbor C of the left reference sample (912) and the below neighbor D of the left reference sample (912), and the left value $L_v$ is derived as (i) an average or (ii) a median value of a value of the left reference sample (912), a value of the above neighbor C, and a value of the below neighbor D.

In an example, the at least one reference sample includes the top-right reference sample G of the current block (901) and the bottom-left reference sample H of the current block (901), and the left value $L_v$ is derived as (i) an average or (ii) a median value of the value of the left reference sample (912), the value of the top-right reference sample G, and the value of the bottom-left reference sample H.

In another aspect, the values at the locations of the top-left reference sample (911), as well as a right neighbor B of the top-left reference sample (911) and a below neighbor A of the top-left reference sample (911) are used to generate (e.g., derive) the top-left value $TL_v$.

The top-left value $TL_v$ can be derived as (i) an average or (ii) a median value of a value of the top-left reference sample (911), a value of the right neighbor B of the top-left reference sample (911), and a value of the below neighbor A of the top-left reference sample (911). For example, an average of the three values (e.g., including the values of the reference samples (911), A, and B) is used as the top-left value $TL_v$. In another example, the median value of the three values is used as the top-left value $TL_v$.

The following descriptions can be applied to both scenarios described above: (i) the first scenario where the top-left value $TL_v$ is the value of the top-left reference sample (911), the top value $T_v$ is the value of the top reference sample (913), and the left value $L_v$ is the value of the left reference sample (912); and (ii) the second scenario where the top-left value $TL_v$, the top value $T_v$, and/or the left value $L_v$ are derived such as described in FIG. 10.

In an aspect, N0 is larger than or equal to 2, when the absolute value $|\Delta_1|$ is greater than N0 multiplied by the absolute value $|\Delta_2|$, the left value $L_v$ associated with the left reference sample (912) can be selected as the prediction value for the sample (902) in the current block (901). In an example of the first scenario, the left reference sample (912) is selected as the prediction sample for the sample (902) in the current block (901), and the prediction value or the left value $L_v$ is $L_{v0}$. In an example of the second scenario, the left value $L_v$ is derived such as described in FIG. 10.

In an example, N1 is larger than or equal to 2, if the absolute value $|\Delta_2|$ (which is the absolute value of b) is greater than N1 multiplied by the absolute value $|\Delta_1|$ (which is the absolute value of a), the top value $T_v$ associated with the top reference sample (913) can be selected as the prediction value for the sample (902) in the current block (901). In an example of the first scenario, the top reference sample (913) is selected as the prediction sample for the sample (902) in the current block (901), and the prediction value or the top value $T_v$ is $T_{v0}$. In an example of the second scenario, the top value $T_v$ is derived such as described in FIG. 10.

In an example, when N0 is larger than or equal to 2, N1 is larger than or equal to 2, the absolute value $|\Delta_1|$ is not greater than N0 multiplied by the absolute value $|\Delta_2|$, and the absolute value $|\Delta_2|$ is not greater than N1 multiplied by the absolute value $|\Delta_1|$, the prediction value for the sample (902) in the current block (901) can be selected based on whether the value $\Delta_1$ and the value $\Delta_2$ have opposite signs. In an example of the first scenario, the prediction sample having the prediction value for the sample (902) in the current block (901) can be selected based on whether the value $\Delta_1$ and the value $\Delta_2$ have opposite signs.

When the value $\Delta_1$ and the value $\Delta_2$ have opposite signs, the top-left value $TL_v$ can be selected as the prediction value for the sample (902) in the current block (901). In an example of the first scenario, the top-left reference sample (911) can be selected as the prediction sample for the sample (902) in the current block (901), and the prediction value is the value $TL_{v0}$ of the top-left reference sample (911). In an example of the second scenario, the top-left value $TL_v$ is derived such as described in FIG. 10. When the value $\Delta_1$ and the value $\Delta_2$ having a same sign, (i) the top value $T_v$ can be selected as the prediction value for the sample (902) in the current block (901) if the absolute value $|\Delta_1|$ is less than the absolute value $|\Delta_2|$, and (ii) the left value $L_v$ can be selected as the prediction value for the sample (902) in the current block (901) if the absolute value $|\Delta_1|$ is not less than the absolute value $|\Delta_2|$. In the first scenario, the top value $T_v$ is $T_{v0}$, and the left value $L_v$ is $L_{v0}$. In the second scenario, the top value Tw and the left value $L_v$ can be derived such as shown in FIG. 10.

In an aspect, N0 is 1. When the absolute value $|\Delta_1|$ is greater than the absolute value $|\Delta_2|$, the left value $L_v$ can be selected as the prediction value for the sample (902) in the current block (901). When the absolute value $|\Delta_1|$ is not greater than the absolute value $|\Delta_2|$, the top value $T_v$ can be selected as the prediction value for the sample (902) in the current block (901). In the first scenario, the top value $T_v$ is $T_{v0}$, and the left value $L_v$ is $L_{v0}$. In the second scenario, the top value $T_v$ and the left value $L_v$ can be derived such as shown in FIG. 10.

As described above, the DNNP mode selects a prediction sample from a specific sample in reference samples (e.g., (911)-(913)) based on the differences (e.g., $\Delta_1$ and $\Delta_2$) between several pairs (e.g., the first pair $L_v$ and $TL_v$, and the second pair $T_v$ and $TL_v$) of the reference samples (e.g., (911)-(913)). If the current block (901) is coded with the DNNP mode, the prediction sample for the sample (902) in the current block (901) can be selected from the top-left reference sample (911) of the current block (901), the top reference sample (913) of the sample (902) that is in the same column as the sample (902), or the left reference sample (912) of the sample (902) that is in the same row as the sample (902) based on differences between pairs of the reference samples (911)-(913).

As described above, for the sample (902), the prediction sample is selected using the top-left sample (911) having the value $TL_{v0}$, the left sample (912) which is valued as ($TL_{v0}$+a) and the top sample (913) which is valued as ($TL_{v0}$+b). The prediction value of the sample (902) is selected from the values $TL_{v0}$, $TL_{v0}$+a and $TL_{v0}$+b based on a and b.

In an example, in the first scenario, $TL_v$=$TL_{v0}$, $T_v$=$T_{v0}$, and $L_v$=$L_{v0}$, and the value a (which is the value $\Delta_1$) is $L_{v0}$-$TL_{v0}$, and the value b (which is the value $\Delta_2$) is $T_{v0}$-$TL_{v0}$.

In one example, the prediction sample value (also referred to as the prediction value) for the sample (marked in X) (902) is derived as follows.

When the absolute value of a (which is the absolute value $|\Delta_1|$) is greater than N0 multiplied by the absolute value of b (which is the absolute value $|\Delta_2|$), the prediction sample is set as the left sample (912), which is valued as $TL_v$+a. N0 can be a predefined or signaled variable. In an example, a value of N0 includes but is not limited to 2.

When the absolute value of b (which is the absolute value $|\Delta_2|$) is greater than N1 multiplied by the absolute value of a (which is the absolute value $|\Delta_1|$), the prediction sample is set as the top sample (913), which is valued as $TL_v$+b. N1 can be a predefined or signaled variable. In an example, a value of N1 includes but is not limited to 2.

Otherwise (e.g., when not greater than N0×$|\Delta_2|$ and $|\Delta_2|$ is not greater than N1×$|\Delta_1|$), the following applies:

When a (or $\Delta_1$) and b ($\Delta_2$) have opposite signs, the prediction sample value is set as $TL_v$.

Otherwise, when a (or $\Delta_1$) and b ($\Delta_2$) have the same sign, the prediction sample value is set as |a|<|b|? ($TL_v$+b):($TL_v$+a), where |•| is the absolute value operator. When the value $\Delta_1$ (which is equal to a) and the value $\Delta_2$ (which is equal to b) have the same sign, (i) $|\Delta_1|$ (which is identical to |a| is less than $|\Delta_2|$ (which is identical to |b|), the top reference sample (913) can be selected as the prediction sample for the sample (902) in the current block (901) and the prediction value is set as the value $T_v$ (which is equal to $TL_v$+b) of the top reference sample (913); (ii) if $|\Delta_1|$ (which is identical to |a|) is not less than $|\Delta_2|$ (which is identical to |b|), the left reference sample (912) can be selected as the prediction sample for the sample (902) in the current block (901) and the prediction value is set as the value $L_v$ (which is equal to $TL_v$+a) of the left reference sample (912).

As discussed above, in the DNNP mode, the prediction value for the sample (902) in the current block (901) can be selected from the top-left value $TL_v$, the top value $T_v$, or the left value $L_v$ based on (i) whether $|\Delta_1|$ is greater than $N0 \times |\Delta_2|$ or (ii) whether $|\Delta_2|$ is greater than $N1 \times |\Delta_1|$. In an example, N0 is 1, and the prediction value for the sample (902) can be selected from $TL_v$, $T_v$, or $L_v$ based on whether $|\Delta_1|$ is greater than $|\Delta_2|$. When the absolute value $|\Delta_1|$ is greater than the absolute value $|\Delta_2|$, the left reference sample (912) can be selected as a prediction sample for the sample (902) in the current block (901). When the absolute value $|\Delta_1|$ is not greater than the absolute value $|\Delta_2|$, the top reference sample (913) can be selected as a prediction sample for the sample (902) in the current block (901).

Thus, in one example, the prediction sample value for the sample X (marked in X) (902) is derived as follows:

When the absolute value of a (which is $|\Delta_1|$) is greater than the absolute value of b (which is $|\Delta_2|$), the prediction sample is set as the left sample (912);

Otherwise, the prediction sample is set as the top sample (913).

In one aspect, a flag is signaled for a coding block (e.g., the current block (901)) to indicate whether the DNNP mode is applied. In an example, one flag (also referred to as a DNNP flag) is signaled for a coding block (e.g., the current block (901)) to indicate whether the DNNP mode is applied. For example, the bitstream comprises the flag (the DNNP flag) signaled for the current block (901) indicating whether the DNNP mode is applied to the current block (901).

In one example, the flag (e.g., the DNNP flag) is signaled before the regular intra prediction modes. The regular intra prediction modes can include angular modes, the planar mode, the DC modes, and/or the like. In an example, the regular intra prediction modes include the angular modes, the planar mode, the DC modes, such as described in the disclosure or used in VVC (or HEVC).

In one example, the flag (e.g., the DNNP flag) is signaled after a decoder-side intra mode derivation (DIMD) mode flag and/or a template based intra mode derivation (TIMD) mode flag.

In one example, the flag is entropy coded using a context model that depends on the values of the DNNP mode flags (e.g., the DNNP flag) of neighboring blocks of the current block (901). In an example, only neighboring blocks that are intra predicted can have the DNNP flags.

In one example, the DNNP mode is signaled as one of the regular intra prediction modes. That is, the total number of the regular intra prediction modes is increased by 1 (which is the DNNP mode). For example, based on VVC, the total number of regular intra prediction modes is increased from 67 to 68. The 68 regular intra prediction modes include the DNNP mode. The DNNP can be one of the most probable modes (MPMs) or one of the non-MPM modes.

In one example, the DNNP mode is signaled as a sub-mode under a specific intra prediction mode. The specific intra prediction mode can be any known intra prediction modes, such as one of the regular intra prediction modes, the DIMD mode, or the like. That is, when the specific intra mode (which is the specific intra prediction mode) is signaled as true, one additional flag is signaled to indicate whether the current block is coded using the specific intra mode or the DNNP mode. In one example, the specific intra prediction mode is the DC mode. In another example, the specific intra prediction mode is one of the Horizontal prediction mode or the Vertical prediction mode.

In one aspect, when deriving the intra prediction mode (e.g., MPMs or an MPM list) of the current block (901) using the intra prediction modes of neighboring blocks, and the neighboring block (e.g., one of the neighboring blocks) is coded using the DNNP mode, the DNNP mode of the neighboring block is mapped (e.g., is converted) to one of the regular intra prediction modes. For example, a neighboring block of the current block (901) is coded using the DNNP mode. When deriving an intra prediction mode of the current block (901) based at least on the neighboring block, the DNNP mode of the neighboring block can be mapped to an intra prediction mode one of the regular intra prediction mode, such as the DC mode, the Planar mode, a Planar-V mode, a Planar-H mode, a Smooth mode, a Smooth-H mode, a Smooth-V mode, or an angular mode. The Planar-V mode and the Planar-H mode can be intra prediction modes that are variants of the Planar mode.

In an aspect, such as in AV1, non-directional intra modes include smooth predictors such as a Smooth-V (or Smooth_V) mode, a Smooth-H (or SMOOTH_H) mode, and a Smooth mode, which predict the block using quadratic interpolation in vertical or horizontal directions, or the average thereof, after approximating the right and bottom edges as the rightmost pixel in the top edge and the bottom pixel in the left edge.

In one example, the DNNP mode is mapped to the DC mode. For example, the neighboring blocks of the current block (901) are used to derive the MPM list of the current block (901). If one of the neighboring blocks of the current block (901) is coded using the DNNP mode, the MPM list of the current block (901) includes the DC mode which is converted from the DNNP mode.

In one example, the DNNP mode is mapped to one of the horizontal mode and the vertical prediction mode. For example, if the DNNP prediction is from a left side of the current block (901), the prediction mode (which is the DNNP mode) is mapped to the horizontal prediction mode, and for example, the MPM list of the current block (901) includes the horizontal prediction mode. If the DNNP prediction is from a top side of the current block (901), the prediction mode (which is the DNNP mode) is mapped to the vertical prediction mode, and thus for example, the MPM list of the current block (901) includes the vertical prediction mode.

In one example, the DNNP mode is mapped to one of the Planar mode, the Planar-V mode, and the Planar-H mode.

In an example, the current block (901) is coded with the DNNP mode. An MPM list of a neighboring block of the current block (901) can be derived based on the DNNP mode of the current block (901). The DNNP mode of the current block (901) can be mapped to one of the regular intra prediction mode (e.g., the DC mode, the Planar mode, the Planar-V mode, the Planar-H mode, or an angular mode), and the MPM list of the neighboring block includes the one of the regular intra prediction mode.

In one aspect, when deriving a chroma intra prediction mode using an intra prediction mode of a co-located luma block and the intra prediction mode of the co-located luma block is the DNNP mode, then the derived mode (DM) is derived as one of the regular intra prediction modes.

In one example, the DM mode is derived as DC mode.

In one example, the DM mode is derived as one of the horizontal prediction mode and the vertical prediction mode. For example, if the DNNP prediction is from the left side, the prediction mode is mapped to the horizontal prediction mode; if the DNNP prediction is from the top side, the prediction mode is mapped to the vertical prediction mode.

In one example, the DM mode is derived as one of the Planar, the Planar-V and the Planar-H modes.

For example, the current block (901) is a chroma block coded with the chroma intra prediction mode. The chroma intra prediction mode of the current block (901) can be derived from the intra prediction mode of the co-located luma block of the current block (901). In an example, when the intra prediction mode of the co-located luma block is the DNNP mode, the chroma intra prediction mode of the current block (901) can be derived as one of the regular intra prediction modes, such as an intra prediction mode that is one of the DC mode, the Planar mode, the Planar-V mode, the Planar-H mode, a Smooth mode, a Smooth-H mode, a Smooth-V mode, or an angular mode.

In an example, the bitstream comprises a signaled high level syntax element or flag indicating whether the DNNP mode is enabled at a corresponding high level.

In one aspect, the high level syntax element or flag, such as at a sequence level (e.g., signaled in a sequence parameter set (SPS)), at a picture level (e.g., signaled in a picture parameter set (PPS) or a Picture Header), or at a slice/tile/tile-group level, may be signaled to indicate whether the DNNP mode is enabled at the corresponding level.

Figure 11:
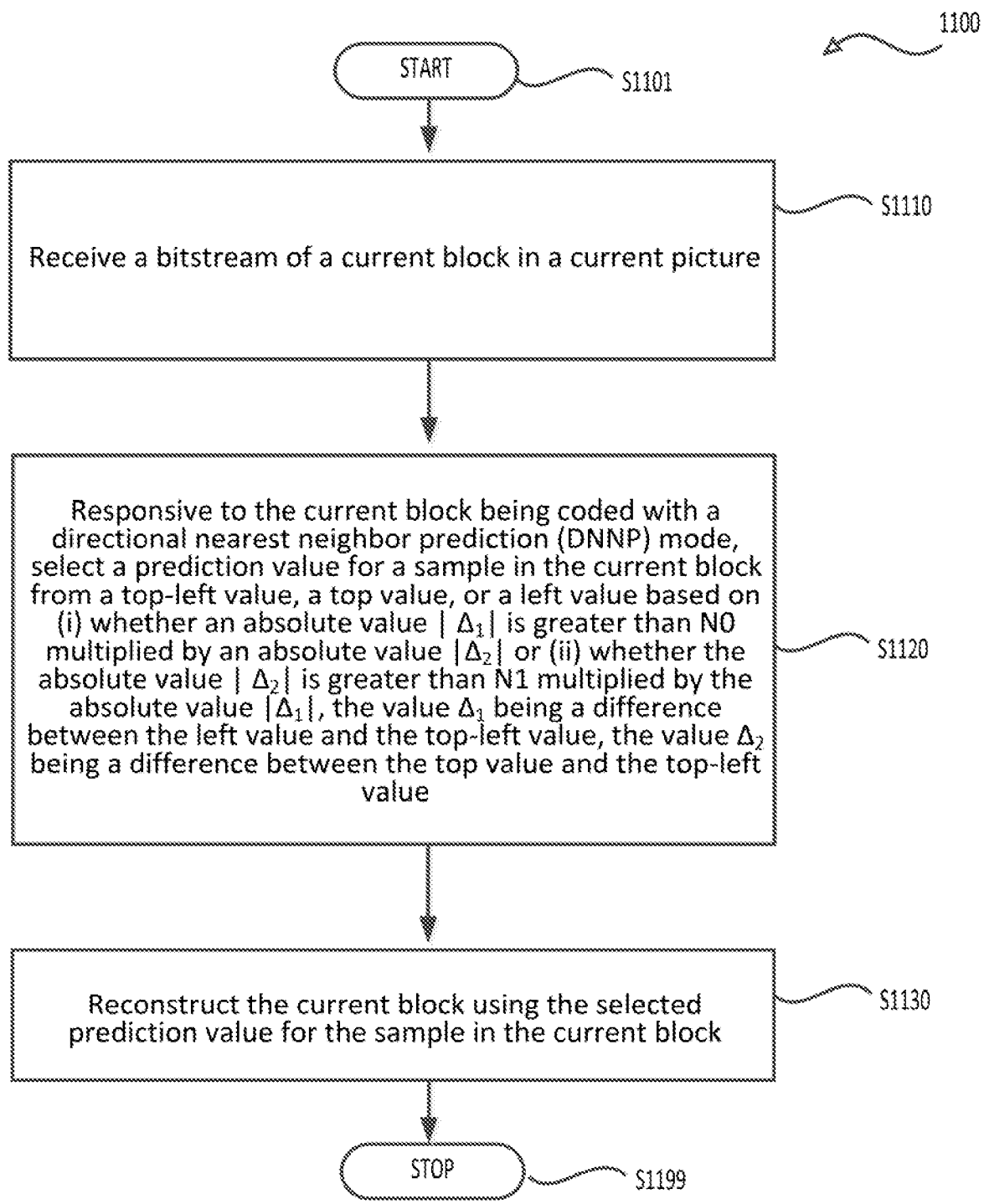
FIG. 11 shows a flow chart outlining a process according to some aspects of the disclosure.

FIG. 11 shows a flow chart outlining a process (1100) according to an aspect of the disclosure. The process (1100) can be used in a video decoder. In various aspects, the process (1100) is executed by processing circuitry, such as the processing circuitry that performs functions of the video decoder (110), the processing circuitry that performs functions of the video decoder (210), and the like. In some aspects, the process (1100) is implemented in software instructions, thus when the processing circuitry executes the software instructions, the processing circuitry performs the process (1100). The process starts at (S1101) and proceeds to (S1110).

At (S1110), a bitstream of a current block in a current picture is received.

At (S1120), if the current block is coded with a directional nearest neighbor prediction (DNNP) mode, a prediction value can be selected for a sample in the current block from a top-left value $TL_v$, a top value $T_v$, or a left value $L_v$ based on (i) whether an absolute value $|\Delta_1|$ is greater than N0 multiplied by an absolute value $|\Delta_2|$ or (ii) whether the absolute value $|\Delta_1|$ is greater than N1 multiplied by the absolute value such as described in FIGS. 10-11. The value $\Delta_1$ can be a difference between the left value and the top-left value. The value $\Delta_2$ can be a difference between the top value and the top-left value. The top-left value can be associated with a top-left reference sample of the current block, the top value can be associated with a top reference sample of the sample that is in a same column as the sample, and the left value can be associated with a left reference sample of the sample that is in a same row as the sample such as described in FIGS. 10-11. N0 can be a first positive integer, and N1 can be a second positive integer.

At (S1130), the current block can be reconstructed using the selected prediction value for the sample in the current block.

Then, the process proceeds to (S1199) and terminates.

The process (1100) can be suitably adapted. Step(s) in the process (1100) can be modified and/or omitted. Additional step(s) can be added. Any suitable order of implementation can be used.

Figure 12:
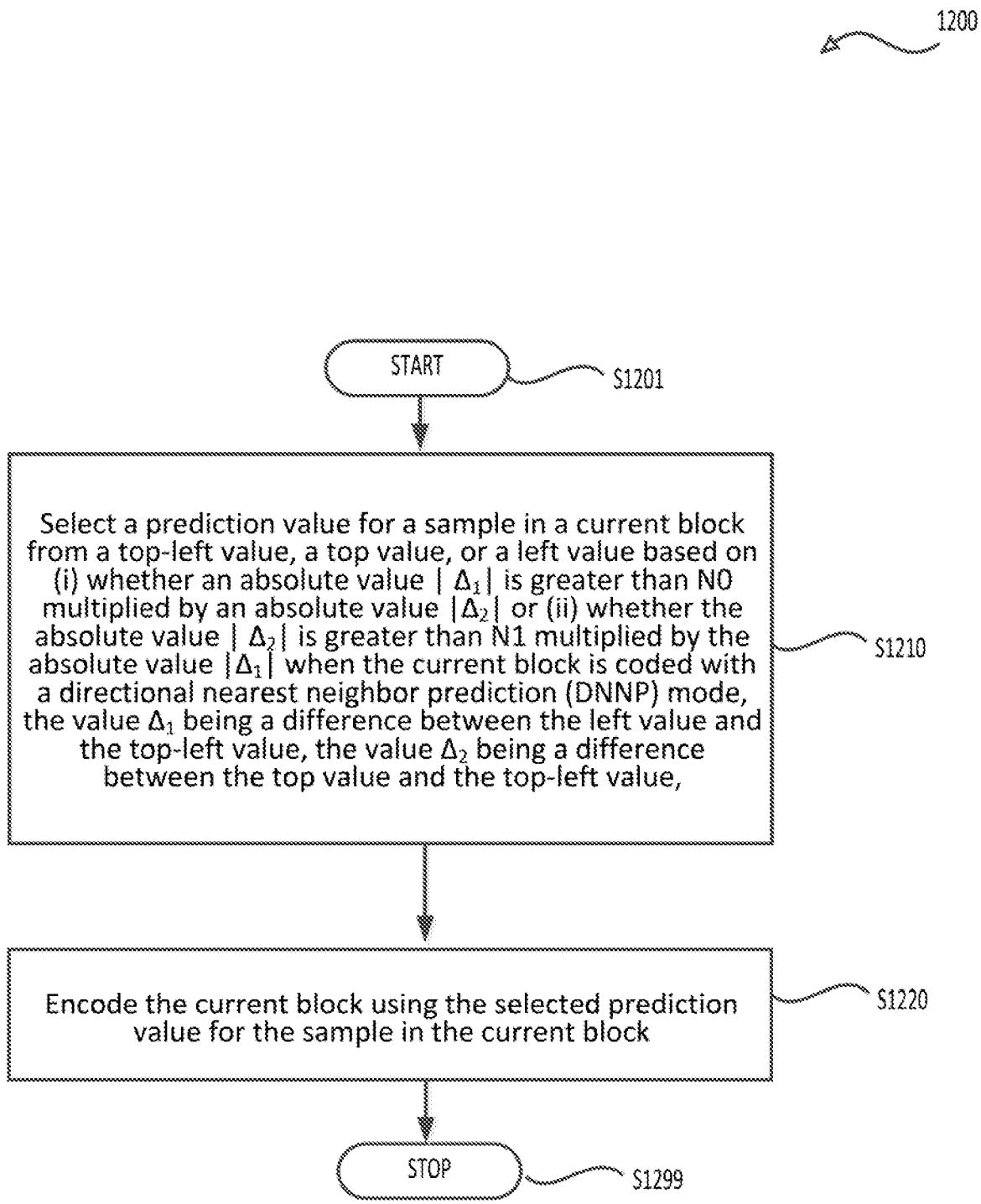
FIG. 12 shows a flow chart outlining another process according to some aspects of the disclosure.

FIG. 12 shows a flow chart outlining a process (1200) according to an aspect of the disclosure. The process (1200) can be used in a video encoder. In various aspects, the process (1200) is executed by processing circuitry, such as the processing circuitry that performs functions of the video encoder (103), the processing circuitry that performs functions of the video encoder (303), and the like. In some aspects, the process (1200) is implemented in software instructions, thus when the processing circuitry executes the software instructions, the processing circuitry performs the process (1200). The process starts at (S1201) and proceeds to (S1210).

At (S1210), a prediction value for a sample in a current block can be selected from a top-left value, a top value, or a left value based on (i) whether an absolute value $|\Delta 1|$ is greater than N0 multiplied by an absolute value $|\Delta 2|$ or (ii) whether the absolute value $|\Delta 2|$ is greater than N1 multiplied by the absolute value $|\Delta 2|$ when the current block is coded with a directional nearest neighbor prediction (DNNP) mode such as described in FIGS. 10-11. The value $\Delta 1$ can be a difference between the left value and the top-left value, and the value $\Delta 2$ can be a difference between the top value and the top-left value. The top-left value can be associated with a top-left reference sample of the current block, the top value can be associated with a top reference sample of the sample that is in a same column as the sample, and the left value can be associated with a left reference sample of the sample that is in a same row as the sample such as described in FIGS. 10-11. N0 can be a first positive integer, and N1 can be a second positive integer.

At (S1220), the current block can be encoded using the selected prediction value for the sample in the current block.

Then, the process proceeds to (S1299) and terminates.

The process (1200) can be suitably adapted. Step(s) in the process (1200) can be modified and/or omitted. Additional step(s) can be added. Any suitable order of implementation can be used.

Figure 13:
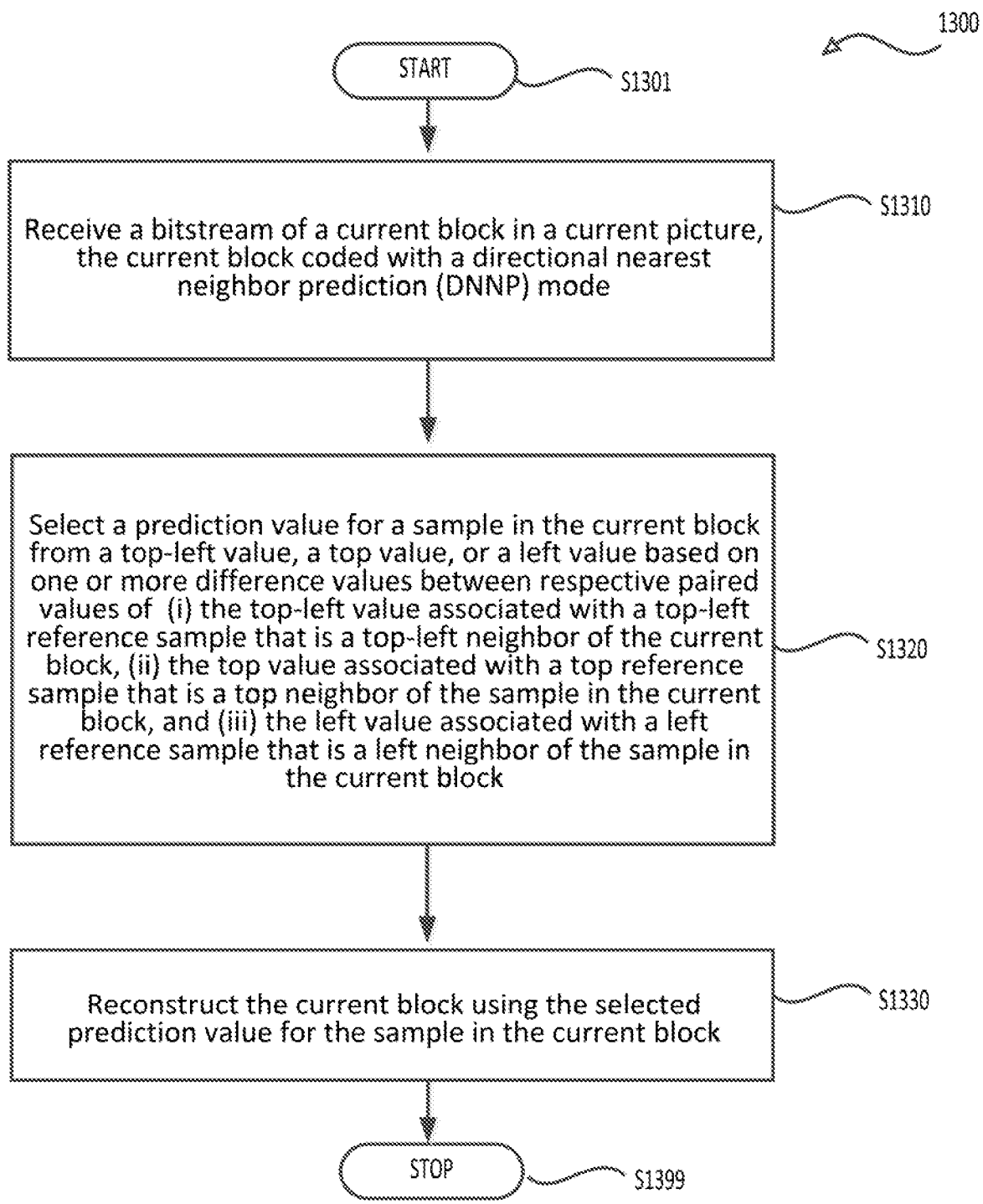
FIG. 13 shows a flow chart outlining a process according to some aspects of the disclosure.

FIG. 13 shows a flow chart outlining a process (1300) according to an aspect of the disclosure. The process (1300) can be a variation of the process (1100). The process (1300) can be used in a video decoder. In various aspects, the process (1300) is executed by processing circuitry, such as the processing circuitry that performs functions of the video decoder (110), the processing circuitry that performs functions of the video decoder (210), and the like. In some aspects, the process (1300) is implemented in software instructions, thus when the processing circuitry executes the software instructions, the processing circuitry performs the process (1300). The process starts at (S1301) and proceeds to (S1310).

At (S1310), a bitstream of a current block in a current picture is received, wherein the current block is coded with a directional nearest neighbor prediction (DNNP) mode.

At (S1320), a prediction value for a sample in the current block can be selected from a top-left value, a top value, or a left value based on one or more difference values between respective paired values of (i) the top-left value associated with a top-left reference sample that is a top-left neighbor of the current block, (ii) the top value associated with a top reference sample that is a top neighbor of the sample in the current block, and (iii) the left value associated with a left reference sample that is a left neighbor of the sample in the current block, such as described in FIGS. 9-10.

At (S1330), the current block is reconstructed using the selected prediction value for the sample in the current block.

Then, the process proceeds to (S1399) and terminates.

The process (1300) can be suitably adapted. Step(s) in the process (1300) can be modified and/or omitted. Additional step(s) can be added. Any suitable order of implementation can be used.

Aspects in the disclosure may be used separately or combined in any order. Further, each of the methods (or aspects), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 14 shows a computer system (1400) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
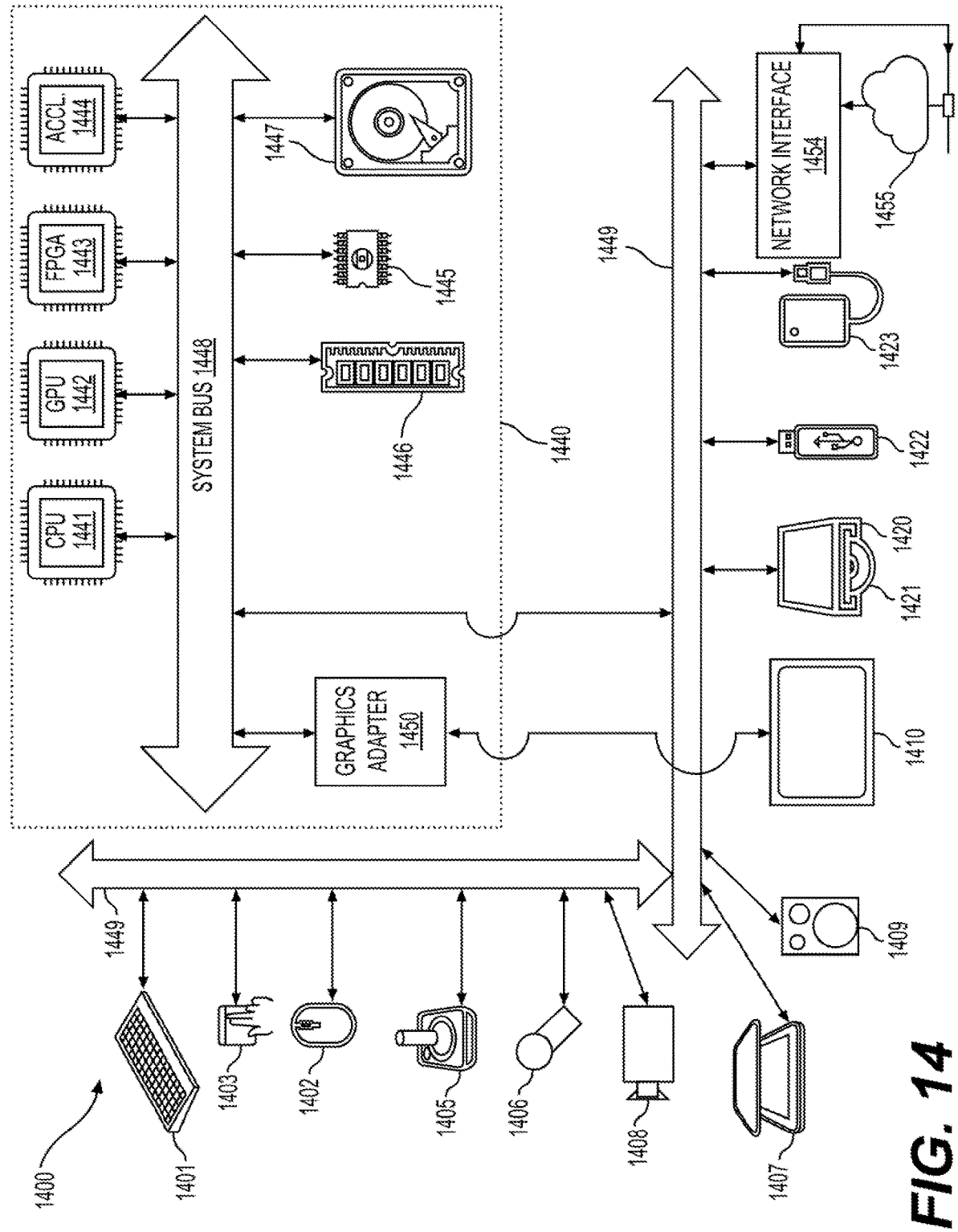
FIG. 14 is a schematic illustration of a computer system in accordance with an aspect.

The components shown in FIG. 14 for computer system (1400) are exemplary in nature and are not intended to suggest any limitation as to the scope of use or functionality of the computer software implementing aspects of the present disclosure. Neither should the configuration of components be interpreted as having any dependency or requirement relating to any one or combination of components illustrated in the exemplary aspect of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various aspects of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving a bitstream of a current block in a current picture, wherein the current block is coded with a directional nearest neighbor prediction (DNNP) mode;
selecting a prediction value for a sample in the current block from a top-left value, a top value, or a left value based on a comparison of two difference values $\Delta_1$ and $\Delta_2$, the value $\Delta_1$ being a difference between the left value and the top-left value and the value $\Delta_2$ being a difference between the top value and the top-left value, the top-left value being associated with a top-left reference sample that is a top-left neighbor of the current block, the top value associated being with a top reference sample that is a top neighbor of the sample in the current block, and the left value being associated with a left reference sample that is a left neighbor of the sample in the current block; and
reconstructing the current block using the selected prediction value for the sample in the current block.

2. The method of claim 1, wherein
the top reference sample is in a same column as the sample,
the left reference sample is in a same row as the sample, and
the selecting the prediction value includes selecting the prediction value for the sample in the current block from the top-left value, the top value, or the left value based on (i) whether an absolute value $|\Delta_1|$ is greater than N0 multiplied by an absolute value $|\Delta_2|$ or (ii) whether the absolute value $|\Delta_2|$ is greater than N1 multiplied by the absolute value $|\Delta_1|$, N0 being a first positive integer, N1 being a second positive integer.

3. The method of claim 2, wherein
the top-left value is a value of the top-left reference sample of the current block, the top value is a value of the top reference sample of the sample, and the left value is a value of the left reference sample, and
the selecting includes selecting a prediction sample from the top-left reference sample of the current block, the top reference sample of the sample, and the left reference sample based on (i) whether the absolute value $|\Delta_1|$ is greater than N0 multiplied by the absolute value $|\Delta_2|$ or (ii) whether the absolute value $|\Delta_2|$ is greater than N1 multiplied by the absolute value $|\Delta_1|$, a value of the prediction sample being the prediction value.

4. The method of claim 1, further comprising:
deriving the top value using the top reference sample and at least one reference sample including one or more of (i) a left neighbor of the top reference sample, (ii) a right neighbor of the top reference sample, (iii) a top-right reference sample of the current block, and (iv) a bottom-left reference sample of the current block.

5. The method of claim 4, wherein
the at least one reference sample includes the left neighbor of the top reference sample and the right neighbor of the top reference sample, and
the deriving the top value includes deriving the top value as (i) an average or (ii) a median value of a value of the top reference sample, a value of the left neighbor of the top reference sample, and a value of the right neighbor of the top reference sample.

6. The method of claim 4, wherein
the at least one reference sample includes the top-right reference sample of the current block and the bottom-left reference sample of the current block, and
the deriving the top value includes deriving the top value as (i) an average or (ii) a median value of a value of the top reference sample, a value of the top-right reference sample of the current block, and a value of the bottom-left reference sample of the current block.

7. The method of claim 1, further comprising:
deriving the left value using the left reference sample and at least one reference sample including one or more of (i) an above neighbor of the left reference sample, (ii) a below neighbor of the left reference sample, (iii) a top-right reference sample of the current block, and (iv) a bottom-left reference sample of the current block.

8. The method of claim 7, wherein
when the at least one reference sample includes the above neighbor of the left reference sample and the below neighbor of the left reference sample, the deriving the left value includes deriving the left value as (i) an average or (ii) a median value of a value of the left reference sample, a value of the above neighbor of the left reference sample, and a value of the below neighbor of the left reference sample; or
when the at least one reference sample includes the top-right reference sample of the current block and the bottom-left reference sample of the current block, the deriving the left value includes deriving the left value as (i) an average or (ii) a median value of the value of the left reference sample, a value of the top-right reference sample of the current block, and a value of the bottom-left reference sample of the current block.

9. The method of claim 1, further comprising:
deriving the top-left value using the top-left reference sample, a right neighbor of the top-left reference sample, and a below neighbor of the top-left reference sample.

10. The method of claim 9, wherein the deriving the top-left value comprises:
deriving the top-left value as (i) an average or (ii) a median value of a value of the top-left reference sample, a value of the right neighbor of the top-left reference sample, and a value of the below neighbor of the top-left reference sample.

11. The method of claim 2, wherein
N0 is larger than or equal to 2; and
the selecting includes when the absolute value $|\Delta_1|$ is greater than N0 multiplied by the absolute value $|\Delta_2|$, selecting the left value as the prediction value for the sample in the current block.

12. The method of claim 2, wherein
N1 is larger than or equal to 2; and
the selecting includes when the absolute value $|\Delta_2|$ is greater than N1 multiplied by the absolute value $|\Delta_1|$, selecting the top value as the prediction value for the sample in the current block.

13. The method of claim 2, wherein
N0 is larger than or equal to 2 and N1 is larger than or equal to 2; and
when the absolute value $|\Delta_1|$ is not greater than N0 multiplied by the absolute value $|\Delta_2|$ and the absolute value $|\Delta_2|$ is not greater than N1 multiplied by the absolute value $|\Delta_1|$, the selecting includes selecting the prediction value for the sample in the current block based on whether the value $\Delta_1$ and the value $\Delta_2$ have opposite signs.

14. The method of claim 13, wherein the selecting comprises:
when the value $\Delta_1$ and the value $\Delta_2$ have opposite signs, selecting the top-left value as the prediction value for the sample in the current block; and
when the value $\Delta_1$ and the value $\Delta_2$ have a same sign, the selecting includes:
selecting the top value as the prediction value for the sample in the current block when the absolute value $|\Delta_1|$ is less than the absolute value $|\Delta_2|$; and
selecting the left value as the prediction value for the sample in the current block when the absolute value $|\Delta_1|$ is not less than the absolute value $|_4|$.

15. The method of claim 2, wherein
N0 is 1; and
the selecting includes:
when the absolute value $|\Delta_1|$ is greater than the absolute value $|\Delta_2|$, selecting the left value as the prediction value for the sample in the current block; and
when the absolute value $|\Delta_1|$ is not greater than the absolute value $|\Delta_2|$, selecting the top value as the prediction value for the sample in the current block.

16. The method of claim 1, wherein the bitstream comprises one of (i) a signaled high level syntax element indicating whether the DNNP mode is enabled at a corresponding high level and (ii) a flag signaled for the current block indicating whether the DNNP mode is applied to the current block.

17. The method of claim 1, wherein
a neighboring block of the current block is coded using the DNNP mode; and
when an intra prediction mode of the current block is derived based at least on the neighboring block, the method includes mapping the DNNP mode of the neighboring block to the intra prediction mode that is one of a DC mode, a Planar mode, a Planar-V mode, a Planar-H mode, a Smooth mode, a Smooth-H mode, a Smooth-V mode, or an angular mode.

18. The method of claim 1, wherein
the current block is a chroma block coded with a chroma intra prediction mode, and
the method includes deriving the chroma intra prediction mode of the current block from an intra prediction mode of a co-located luma block of the current block by deriving the chroma intra prediction mode of the current block as an intra prediction mode that is one of a DC mode, a Planar mode, a Planar-V mode, a Planar-H mode, a Smooth mode, a Smooth-H mode, a Smooth-V mode, or an angular mode when the intra prediction mode of the co-located luma block is a DNNP mode.

19. A method of video encoding, comprising:
selecting a prediction value for a sample in a current block in a current picture from a top-left value, a top value, or a left value based on a comparison of two difference values $\Delta_1$ and $\Delta_2$, the value $\Delta_1$ being a difference between the left value and the top-left value and the value $\Delta_2$ being a difference between the top value and the top-left value, the top-left value being associated with a top-left reference sample that is a top-left neighbor of the current block, the top value associated being with a top reference sample that is a top neighbor of the sample in the current block, and the left value being associated with a left reference sample that is a left neighbor of the sample in the current block; and encoding the current block with a directional nearest neighbor prediction (DNNP) mode using the selected prediction value for the sample in the current block.

20. A non-transitory computer readable medium storing a video media bitstream encoded by an encoding method, the encoding method comprising:

selecting a prediction value for a sample in a current block in a current picture from a top-left value, a top value, or a left value based on a comparison of two difference values $\Delta_1$ and $\Delta_2$, the value $\Delta_1$ being a difference between the left value and the top-left value and the value $\Delta_2$ being a difference between the top value and the top-left value, the top-left value being associated with a top-left reference sample that is a top-left neighbor of the current block, the top value associated being with a top reference sample that is a top neighbor of the sample in the current block, and the left value being associated with a left reference sample that is a left neighbor of the sample in the current block; and encoding the current block with a directional nearest neighbor prediction (DNNP) mode using the selected prediction value for the sample in the current block.

* * * * *